United States Patent
Ando (10) Patent No.: US 10,906,422 B2
(45) Date of Patent: Feb. 2, 2021

(54) POWER SUPPLY CONTROLLER CONFIGURED TO FINISH CHARGING ELECTRIC VEHICLE BASED ON TIME WHEN DRIVER RETURNS TO VEHICLE

(71) Applicant: Toyota Jidosha Kabushiki Kaisha, Toyota (JP)

(72) Inventor: Toru Ando, Obu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 143 days.

(21) Appl. No.: 16/209,315

(22) Filed: Dec. 4, 2018

(65) Prior Publication Data

US 2019/0170526 A1 Jun. 6, 2019

(30) Foreign Application Priority Data

Dec. 6, 2017 (JP) ................................. 2017-234418

(51) Int. Cl.
*B60L 53/00* (2019.01)
*B60L 53/60* (2019.01)
*G01C 21/34* (2006.01)

(52) U.S. Cl.
CPC .......... *B60L 53/60* (2019.02); *G01C 21/3469* (2013.01); *G01C 21/3484* (2013.01); *B60L 2240/622* (2013.01); *B60L 2240/80* (2013.01); *Y02T 90/16* (2013.01); *Y02T 90/167* (2013.01)

(58) Field of Classification Search
CPC ................. B60L 53/60; B60L 2240/80; B60L 2240/622; G01C 21/3484; G01C 21/3469; G01C 21/3697; G01C 21/3407; G01C 21/005; Y02T 90/168; Y02T 90/162
See application file for complete search history.

(56) References Cited

U.S. PATENT DOCUMENTS

| 8,610,401 | B2 * | 12/2013 | Kim | G07C 5/008 |
| | | | | 320/109 |
| 8,868,289 | B2 * | 10/2014 | Miljkovic | G01C 21/00 |
| | | | | 340/990 |
| 9,299,255 | B2 * | 3/2016 | Yarnold | G08G 1/123 |
| 9,456,310 | B2 * | 9/2016 | Boothroyd | H04W 4/029 |

(Continued)

FOREIGN PATENT DOCUMENTS

| JP | 2011205828 A | * | 10/2011 |
| JP | 2013-102609 A | | 5/2013 |
| JP | 2013186519 A | * | 9/2013 |

*Primary Examiner* — Naum Levin
(74) *Attorney, Agent, or Firm* — Dinsmore & Shohl LLP (57) ABSTRACT

A vehicle includes: a power storage device configured to be charged using a power supply facility external to a vehicle; a communication device configured to obtain information indicating a user location Pu, from a user terminal carried by a user; and a vehicle ECU. In a charging standby state for the charging of the power storage device using the power supply facility, the vehicle ECU calculates a user traveling speed Vu and a user distance Du using user location Pu, and calculates a traveling time Tu required for the user to arrive at the vehicle using user traveling speed Vu and user distance Du. The vehicle ECU starts the charging of the power storage device when a value obtained by subtracting (i) a charging time Tc required to complete the charging of the power storage device from (ii) traveling time Tu becomes less than a predetermined value.

2 Claims, 6 Drawing Sheets

(56) References Cited

U.S. PATENT DOCUMENTS

| | | | |
|---|---|---|---|
| 10,081,333 B2 * | 9/2018 | Kim | B60L 53/16 |
| 10,217,360 B2 * | 2/2019 | Miura | G08G 1/146 |
| 10,427,533 B2 * | 10/2019 | Kim | B60L 58/30 |
| 10,431,999 B2 * | 10/2019 | Choe | G06F 1/1656 |
| 2008/0243331 A1 * | 10/2008 | Kato | B60L 50/61 |
| | | | 701/29.5 |
| 2017/0249625 A1 * | 8/2017 | Vossoughi | G06Q 20/3223 |
| 2018/0353039 A1 * | 12/2018 | Erkek | A47L 11/4066 |

* cited by examiner

POWER SUPPLY CONTROLLER CONFIGURED TO FINISH CHARGING ELECTRIC VEHICLE BASED ON TIME WHEN DRIVER RETURNS TO VEHICLE

CROSS REFERENCE TO RELATED APPLICATIONS

This nonprovisional application claims priority to Japanese Patent Application 2017-234418 filed on Dec. 6, 2017, with the Japan Patent Office, the entire contents of which are hereby incorporated by reference.

BACKGROUND

Field

The present disclosure relates to a power control device for a vehicle, the vehicle including a power storage device configured to be charged with power supplied from a power supply facility external to the vehicle.

Description of the Background Art

Japanese Patent Laying-Open No. 2013-102609 discloses a power control device for a vehicle, the vehicle including a power storage device configured to be charged with power supplied from a power supply facility external to the vehicle. This device is configured to calculate a distance from the vehicle to a user of the vehicle based on user location information obtained from a communication terminal owned by the user. When the distance to the user exceeds a predetermined distance, the device is configured to determine that the user is absent and decrease the charge level of the power storage device to a level lower than the full charge level. Accordingly, the power storage device can be suppressed from remaining at the full charge level for a long period of time, thereby suppressing deterioration of the power storage device.

SUMMARY

In Japanese Patent Laying-Open No. 2013-102609, whether or not the user is absent is determined in accordance with the distance from the vehicle to the user. However, it is considered that depending on a traveling speed of the user, the user may arrive at the vehicle earlier than expected and may start to use the vehicle. In this case, the deterioration of the power storage device is suppressed, but the power storage device does not have a sufficient amount of charged power when the user starts to use the vehicle. It is concerned that a possible traveling distance may become short.

The present disclosure has been made to allow a power storage device to have a sufficient amount of charged power when the user starts to use a vehicle while suppressing deterioration of the power storage device.

(1) A power control device for a vehicle according to the present disclosure is a power control device for a vehicle including a power storage device configured to be charged with power supplied from a power supply facility external to the vehicle. The power control device includes: a communication device configured to obtain user location information indicating a present location of a user of the vehicle; and a controller configured to control charging of the power storage device using the power supply facility. In a standby state for the charging of the power storage device using the power supply facility, the controller is configured to: calculate a traveling speed of the user using a history of the user location information obtained by the communication device; calculate a traveling time required for the user to arrive at the vehicle using the traveling speed; calculate a charging time required to complete the charging of the power storage device, using an amount of power stored in the power storage device; and start the charging of the power storage device using the power supply facility when a difference between the traveling time and the charging time becomes less than a predetermined value.

According to the above-described device, the traveling time is calculated using the traveling speed of the user calculated based on the history of the user location information (a plurality of pieces of user location information obtained at respective times). Accordingly, the traveling time can be precisely calculated as compared with a case where the traveling time is calculated without using the traveling speed of the user. Further, the charging of the power storage device is started when the difference between the traveling time and the charging time required to complete the charging of the power storage device becomes less than the predetermined value. Accordingly, the charging of the power storage device can be completed around a time of arrival of the user to the vehicle. As a result, the power storage device can have a sufficient amount of charged power when the user starts to use the vehicle, while suppressing deterioration of the power storage device.

(2) In a certain embodiment, the controller is configured to further calculate a distance to the user using the user location information, and calculate the traveling time using the traveling speed of the user and the distance to the user.

According to the above-described embodiment, the traveling speed of the user and the distance to the user are calculated, and the traveling time is calculated using these. Hence, for example, by dividing the distance to the user by the traveling speed of the user, the traveling time can be calculated precisely. Accordingly, the time of completing the charging of the power storage device can be more precisely close to the time of arrival of the user to the vehicle.

(3) In a certain embodiment, the controller is configured to further calculate a traveling route of the user using the history of the user location information. When it is determined that the user is traveling using public transportation based on the traveling speed of the user and the traveling route of the user, the controller is configured to calculate the traveling time using timetable information of the public transportation that is being used by the user.

According to the above-described embodiment, when it is determined that the user is traveling using public transportation based on the traveling speed of the user and the traveling route of the user (for example, when the traveling route of the user substantially coincides with the traveling route of the public transportation and the traveling speed of the user substantially coincides with the traveling speed of the public transportation), the traveling time is calculated using the timetable information of the public transportation. Hence, the traveling time can be estimated more precisely. Accordingly, the time of completing the charging of the power storage device can be more precisely close to the time of arrival of the user to the vehicle.

The foregoing and other objects, features, aspects and advantages of the present disclosure will become more apparent from the following detailed description of the present disclosure when taken in conjunction with the accompanying drawings.

DESCRIPTION OF THE EMBODIMENTS

The following describes embodiments of the present disclosure with reference to figures in detail. It should be noted that the same or corresponding portions in the figures are given the same reference characters and are not described repeatedly.

<System Configuration>

Figure 1:
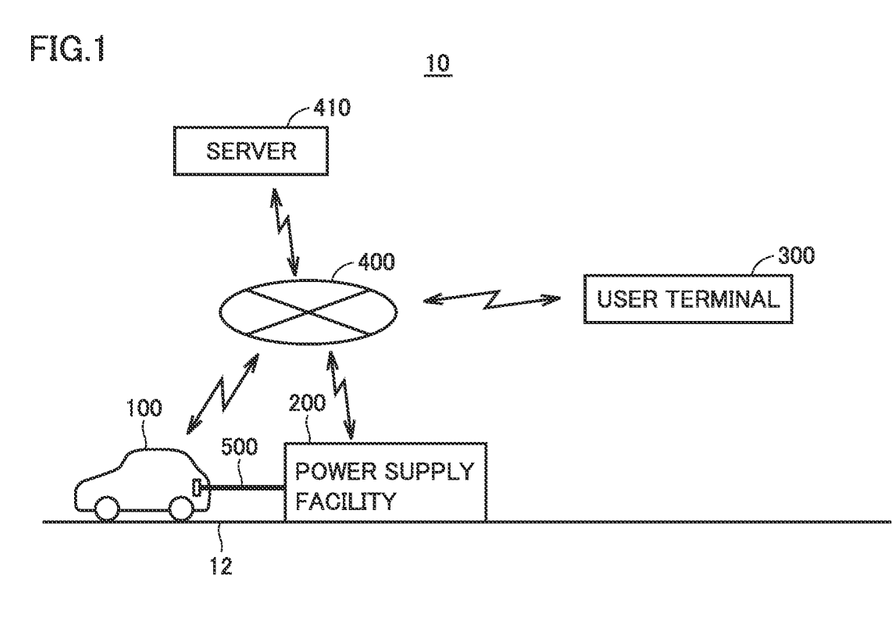
FIG. 1 schematically shows an entire configuration of a power control system.

FIG. 1 schematically shows an entire configuration of a power control system 10 according to the present embodiment. Power control system 10 includes an electrically powered vehicle (hereinafter, also simply referred to as "vehicle") 100, a power supply facility 200, a user terminal 300, and a server 410.

Vehicle 100 includes a power storage device configured to be charged with power supplied from a power supply facility external to the vehicle, and is configured to generate driving power for traveling using power stored in the power storage device.

Power supply facility 200 includes a power cable 500. When power cable 500 is connected to vehicle 100, power supply facility 200 is configured to supply power received from a commercial power grid to vehicle 100 via a power cable 500.

User terminal 300 is a communication terminal (smartphone or the like) that can be carried by the user of vehicle 100.

In response to a request from vehicle 100 or user terminal 300, server 410 is configured to provide various information to vehicle 100 or user terminal 300.

Vehicle 100, power supply facility 200, user terminal 300, and server 410 are configured to wirelessly communicate with one another via a communication network 400 such as the Internet or a telephone network.

Figure 2:
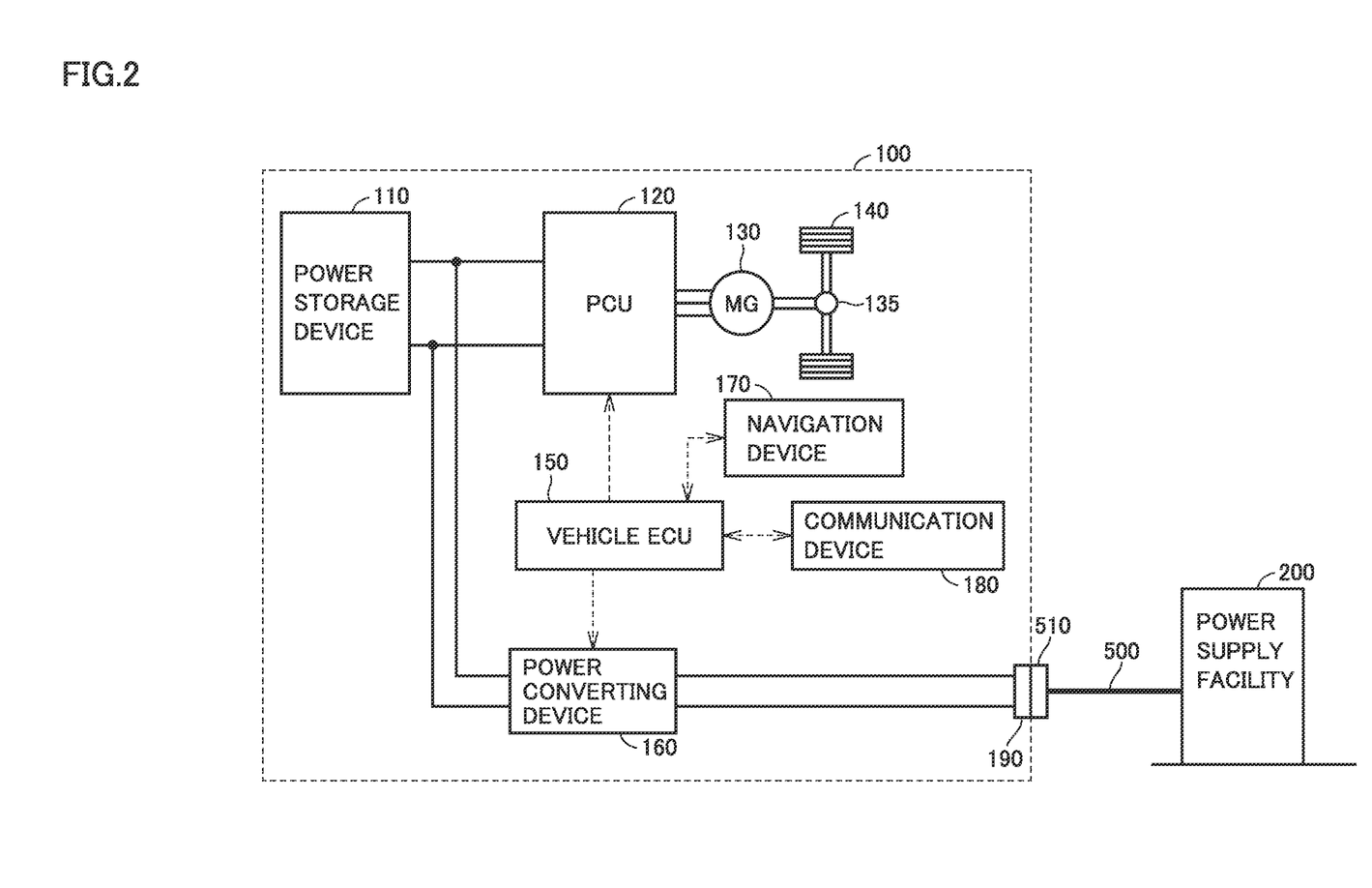
FIG. 2 shows an exemplary configuration of a vehicle.

FIG. 2 shows an exemplary configuration of vehicle 100. Vehicle 100 includes a power storage device 110, a PCU 120 serving as a driving device, a motor generator 130, a power transmitting gear 135, driving wheels 140, a vehicle ECU (Electronic Control Unit) 150, a navigation device 170, and a communication device 180.

Power storage device 110 is configured to be charged and discharged. Power storage device 110 is configured to include a secondary battery such as a lithium ion battery or a nickel-metal hydride battery, for example. Power storage device 110 supplies electric power to PCU 120 so as to generate driving power of vehicle 100. Further, power storage device 110 stores electric power generated by motor generator 130.

PCU 120 is controlled by a control signal from vehicle ECU 150 and converts DC power received from power storage device 110 into AC power for driving motor generator 130.

Motor generator 130 is an alternating-current rotating electrical machine, such as a permanent-magnet type synchronous motor including a rotor having a permanent magnet embedded therein. Output torque of motor generator 130 is transmitted to driving wheels 140 via power transmitting gear 135 to travel vehicle 100. Motor generator 130 is capable of generating electric power using rotation power of driving wheels 140 when vehicle 100 operates for regenerative braking. The electric power thus generated is converted by PCU 120 into charging power for power storage device 110.

Although not shown in FIG. 2, vehicle ECU 150 includes a CPU (Central Processing Unit), a memory, and an input/output buffer, so as to receive signals from sensors, send control signals to devices, and control vehicle 100 and the devices. It should be noted that they can be controlled by not only a process performed by software but also a process performed by dedicated hardware (electronic circuit) constructed therefor.

As a configuration for charging power storage device 110 using power supplied from power supply facility 200, vehicle 100 further includes a power converting device 160 and an inlet 190. Inlet 190 is configured to permit a charging connector 510 of power cable 500 to be connected thereto.

Power converting device 160 is connected between power storage device 110 and inlet 190. Power converting device 160 is controlled by a control signal from vehicle ECU 150 to convert power supplied from power supply facility 200 into power with which power storage device 110 can be charged.

Navigation device 170 includes: a storage device configured to store map information and the like; a location detector configured to detect information indicating a location (hereinafter, referred to as "vehicle location Pv") of vehicle 100 by GPS (Global Positioning System); a display (a liquid crystal panel or the like) configured to present a present vehicle location Pv or present a route to a destination; and an input device (a touch panel, a switch, or the like) configured to receive an operation by the user.

Communication device 180 is an interface for performing wireless communication, via communication network 400, between vehicle ECU 150 and a terminal (power supply facility 200, user terminal 300, server 410, or the like) external to the vehicle.

Figure 3:
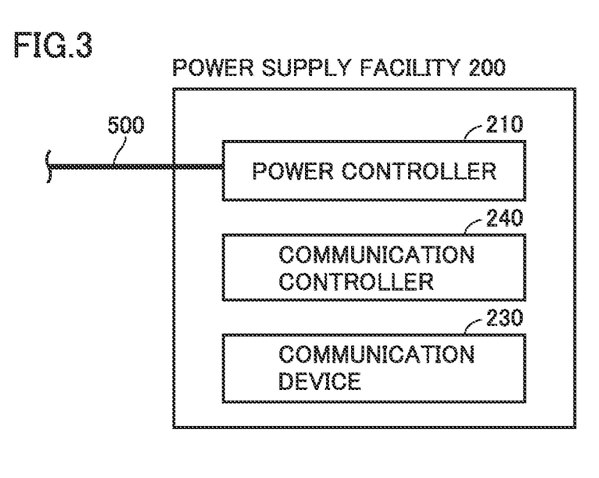
FIG. 3 is a block diagram showing an exemplary configuration of a power supply facility.

FIG. 3 is a block diagram showing an exemplary configuration of power supply facility 200. Power supply facility 200 includes a power controller 210, a communication device 230, and a communication controller 240. Based on information from communication controller 240 or the like, power controller 210 controls power supplied from a commercial power grid to vehicle 100 via power cable 500.

Communication device 230 is an interface for communication with vehicle 100, user terminal 300, and the like via communication network 400.

Communication controller 240 is configured to: send information received by communication device 230 to power controller 210; and send information received from power controller 210 to communication device 230.

Figure 4:
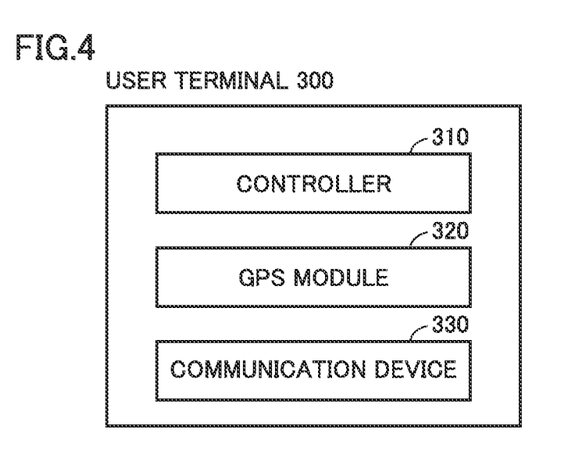
FIG. 4 is a block diagram showing an exemplary configuration of a user terminal.

FIG. 4 is a block diagram showing an exemplary configuration of user terminal 300. User terminal 300 includes a controller 310, a GPS module 320, and a communication device 330.

Communication device 330 is an interface for communication with vehicle 100, power supply facility 200, and the like via communication network 400.

GPS module 320 is a device for detecting a location (hereinafter, also simply referred to as "user location Pu") of user terminal 300 using GPS.

In response to a request from vehicle 100, controller 310 is configured to transmit, to vehicle 100, information of user location Pu detected by GPS module 320.

<Post-Standby Charging>

Vehicle ECU 150 according to the present embodiment is configured to perform "post-standby charging" in response to a request of the user. In the post-standby charging, even when power supply facility 200 is connected to vehicle 100, vehicle ECU 150 maintains the state of power storage device 110 to be in a standby state (hereinafter, also simply referred to as "charging standby state") in which power storage device 110 does not start to be charged, and when a predetermined condition is satisfied in the charging standby state, vehicle ECU 150 starts to charge power storage device 110.

Figure 5:
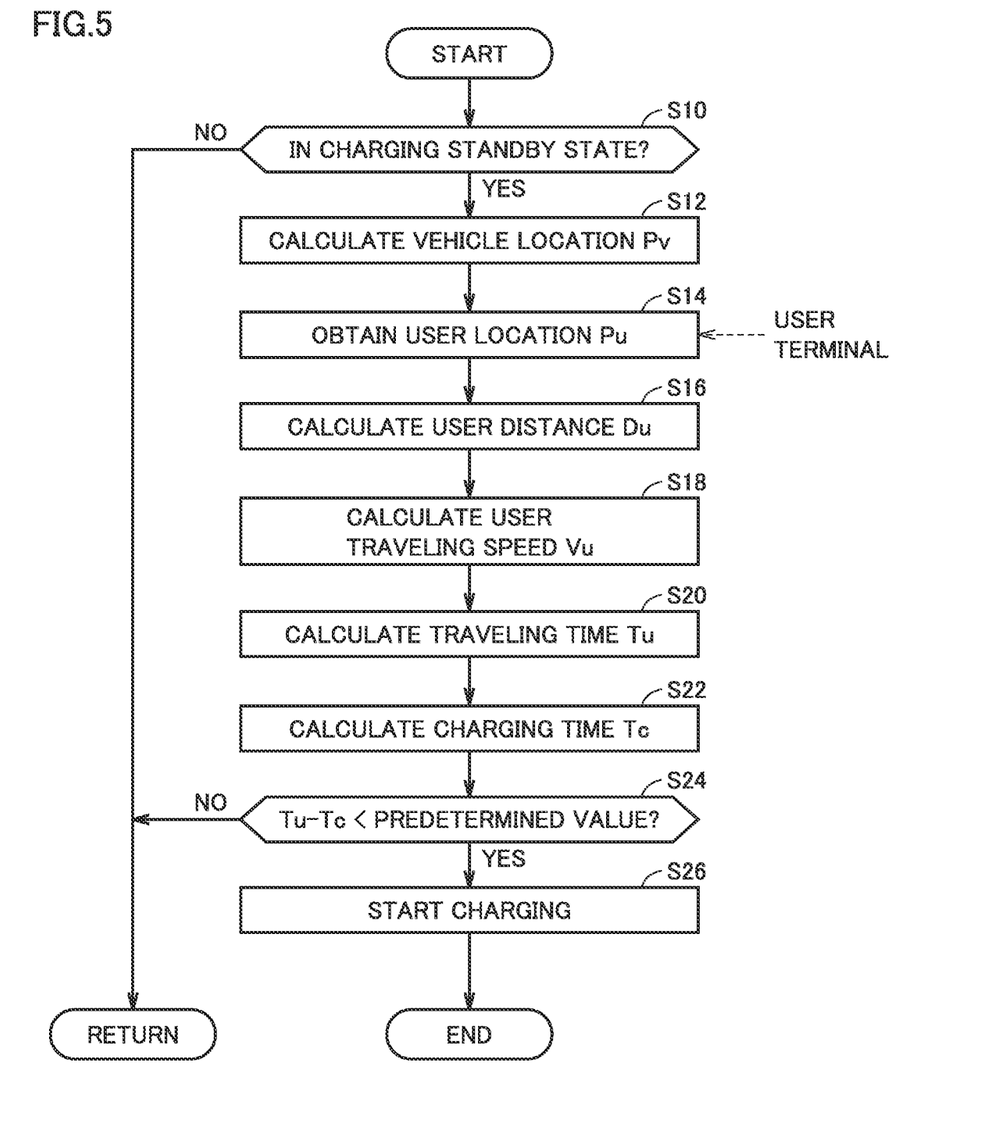
FIG. 5 is a first flowchart showing an exemplary procedure of a process of a vehicle ECU.

FIG. 5 is a flowchart showing an exemplary procedure of a process performed by vehicle ECU 150 when performing the post-standby charging. It should be noted that the flowchart of FIG. 5 is performed in a predetermined cycle until the charging is started.

Vehicle ECU 150 determines whether or not the state of power storage device 110 is in the charging standby state (step S10). When the state of power storage device 110 is not in the charging standby state (NO in step S10), vehicle ECU 150 skips subsequent processes and brings the process to RETURN.

When the state of power storage device 110 is in the charging standby state (YES in step S10), vehicle ECU 150 obtains vehicle location Pv from navigation device 170 (step S12).

Vehicle ECU 150 obtains user location Pu from user terminal 300 (step S14). It should be noted that whenever user location Pu is obtained, user location Pu is stored into the memory of vehicle ECU 150 together with a time at which user location Pu is obtained. Therefore, the memory of vehicle ECU 150 stores a history of user locations Pu at respective predetermined times.

Vehicle ECU 150 calculates a direct distance between vehicle location Pv and user location Pu, as a distance (hereinafter, also referred to as "user distance Du") from vehicle 100 to the user (step S16).

Vehicle ECU 150 uses the history of user locations Pu to calculate a speed (hereinafter, also referred to as "user traveling speed Vu") at which the user approaches vehicle 100 (step S18). For example, vehicle ECU 150 calculates user traveling speed Vu in a present cycle based on a difference between (i) a direct distance (user distance Du in the present cycle) between vehicle location Pv and user location Pu obtained in the present cycle and (ii) a direct distance (user distance Du in a previous cycle) between vehicle location Pv and user location Pu obtained in the previous cycle.

Based on user distance Du and user traveling speed Vu in the present cycle, vehicle ECU 150 calculates a time (hereinafter, also referred to as "traveling time Tu") required for the user to arrive at vehicle 100 (step S20). For example, vehicle ECU 150 calculates, as traveling time Tu, a value (=Du/Vu) obtained by dividing user distance Du by user traveling speed Vu.

Vehicle ECU 150 uses a present amount of power stored in power storage device 110 to calculate a time (hereinafter, also referred to as "charging time Tc") required to complete the charging of power storage device 110 (step S22). For example, vehicle ECU 150 calculates, as charging time Tc, a value obtained by dividing (i) a difference (unit: ampere-hour) between the present amount of stored power and the full charge capacity of power storage device 110 by (ii) expected charging power (unit: watt) of power storage device 110.

It should be noted that in the present embodiment, the expression "completion of charging" refers to a state in which the amount of power stored in power storage device 110 reaches a target amount of power stored therein. Therefore, the timing of the completion of charging corresponds to a timing at which the amount of power stored in power storage device 110 reaches the target amount of power stored therein. It should be noted that the "target amount of power stored" in the charging may be set to the full charge capacity of power storage device 110, or may set to an amount of power (amount of power smaller than the full charge capacity) by which vehicle 1 can travel a distance set by the user.

Next, vehicle ECU 150 determines whether or not a value obtained by subtracting charging time Tc from traveling time Tu is less than a predetermined value (step S24).

When the value obtained by subtracting charging time Tc from traveling time Tu is not less than the predetermined value (NO in step S24), vehicle ECU 150 brings the process to RETURN without starting the charging.

When the value obtained by subtracting charging time Tc from traveling time Tu is less than the predetermined value (YES in step S24), vehicle ECU 150 starts to charge power storage device 110 using power supply facility 200 (step S26).

As described above, in the charging standby state, vehicle ECU 150 according to the present embodiment calculates user traveling speed Vu using the history of user locations Pu obtained from user terminal 300, and calculates traveling time Tu using user traveling speed Vu. Accordingly, traveling time Tu can be precisely calculated as compared with a case where traveling time Tu is calculated without using user traveling speed Vu.

Then, vehicle ECU 150 calculates charging time Tc using the amount of power stored in power storage device 110. When the value obtained by subtracting charging time Tc from traveling time Tu becomes less than the predetermined value, vehicle ECU 150 starts to charge power storage device 110. Accordingly, the charging of power storage device 110 can be completed around a time of arrival of the user to vehicle 100. Therefore, the charging of power storage device 110 can be completed at the time of the user starting to use vehicle 100, and the charging completion state (state in which the amount of power stored in power storage device 110 has reached the target amount of stored power and therefore is comparatively large) is avoided from continuing for a long time in absence of the user, whereby the deterioration of power storage device 110 is suppressed. As a result, power storage device 110 can have a sufficient amount of charged power when the user starts to use vehicle 100, while suppressing deterioration of power storage device 110.

Particularly, vehicle ECU 150 according to the present embodiment further calculates user distance Du using user location Pu, and calculates traveling time Tu using user traveling speed Vu and user distance Du. Accordingly, traveling time Tu can be calculated precisely. Accordingly, the time of completing the charging of power storage device 110 can be more precisely close to the time of arrival of the user to vehicle 100.

<Modification>

In the above-described embodiment, it has been illustratively described that traveling time Tu is calculated using user traveling speed Vu and user distance Du.

However, the method for calculating traveling time Tu is not limited to this. For example, in addition to user traveling speed Vu, a traveling route (hereinafter, also referred to as "user traveling route Ru") of the user may be further calculated using the history of user locations Pu. When it is determined that the user is traveling using public transportation (such as a railway vehicle, a bus on a regular route, or an airplane) based on user traveling speed Vu and user traveling route Ru, traveling time Tu may be calculated using timetable information of the public transportation that is being used by the user.

Figure 6:
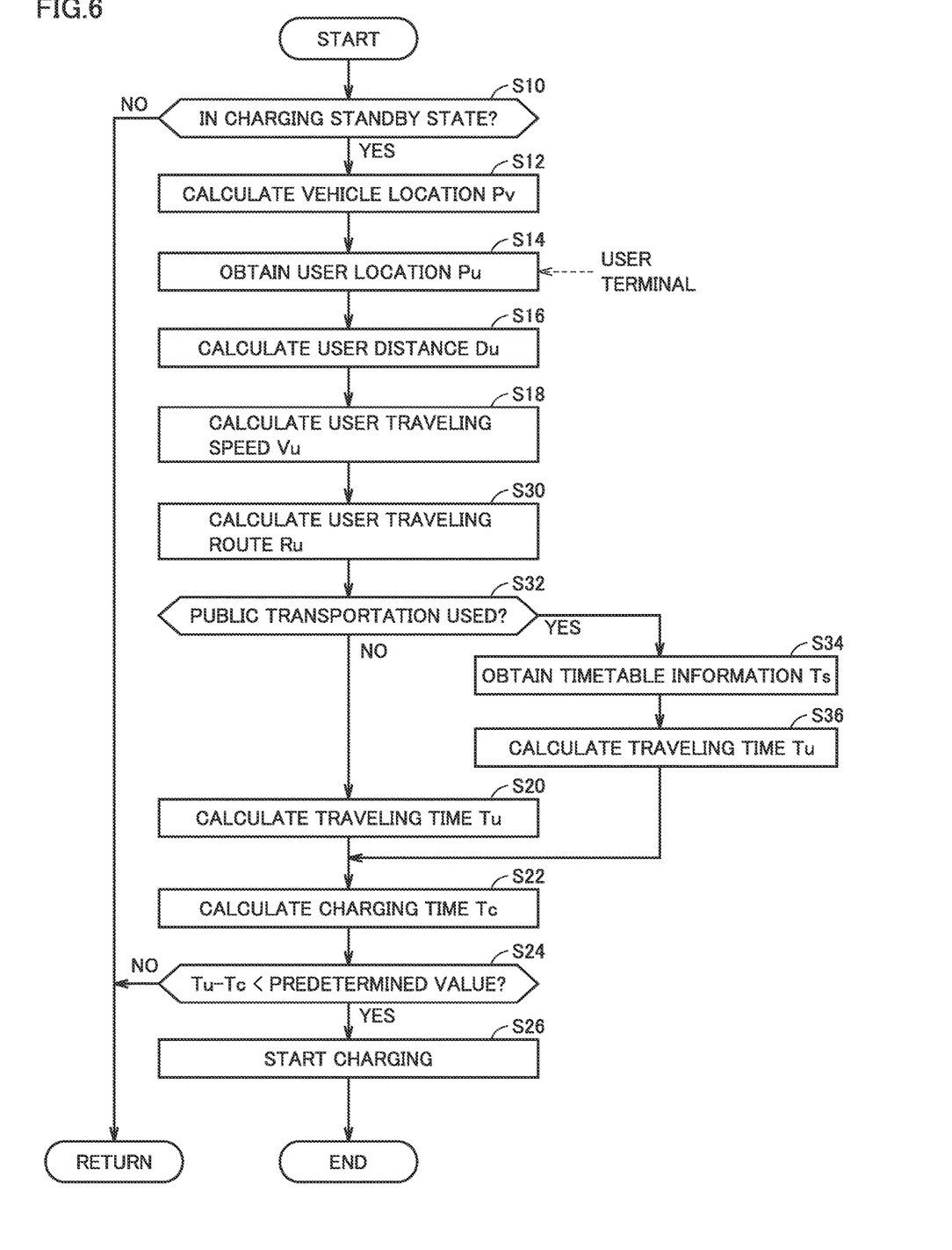
FIG. 6 is a second flowchart showing an exemplary procedure of a process of the vehicle ECU.

FIG. 6 is a flowchart showing an exemplary procedure of a process performed by vehicle ECU 150 according to the present modification when performing the post-standby charging. The flowchart of FIG. 6 is obtained by adding steps S30 to S36 to the flowchart of FIG. 5 above. The other steps (steps given the same numerals as those of the steps in FIG. 5 above) have been already described and therefore will not be described repeatedly here in detail.

After calculating user traveling speed Vu, vehicle ECU 150 further calculates user traveling route Ru using the history of user locations Pu (step S30). For example, vehicle ECU 150 calculates, as user traveling route Ru, a route obtained by connecting together a plurality of user locations Pu obtained until the present cycle.

Based on user traveling speed Vu and user traveling route Ru, vehicle ECU 150 determines whether or not the user is traveling using public transportation (step S32). For example, vehicle ECU 150 determines that the user is traveling using public transportation, when user traveling route Ru substantially coincides with a particular traveling route of public transportation and when the traveling speed of the user substantially coincides with the traveling speed of the public transportation. It should be noted that the information of the traveling route of the public transportation and the traveling speed thereof may be stored in advance in the map information of navigation device 170 and may be read as required, or may be obtained from server 410 in real time, for example.

When it is not determined that the user is traveling using public transportation (NO in step S32), vehicle ECU 150 brings the process to step S20 to calculate traveling time Tu based on user distance Du and user traveling speed Vu (step S20).

On the other hand, when it is determined that the user is traveling using public transportation (YES in step S32), vehicle ECU 150 obtains timetable information Ts of the public transportation that is being used by the user (step S34). For example, when the user is traveling using a railway vehicle, vehicle ECU 150 obtains timetable information Ts of the railway vehicle. It should be noted that timetable information Ts may be obtained from server 410 in real time, or may be stored in advance in the map information of navigation device 170 and may be read as required.

Next, vehicle ECU 150 calculates traveling time Tu based on timetable information Ts (step S36). For example, when the user is traveling using a railway vehicle, based on timetable information Ts of the railway vehicle, vehicle ECU 150 specifies a period of time until arrival of the railway vehicle to the nearest station (the nearest station from a parking location of vehicle 100), and calculates, as traveling time Tu, a value obtained by adding (i) a period of time required for the user to move from the nearest station to the parking location of vehicle 100 to (ii) the period of time until the arrival to the nearest station. It should be noted that the period of time required for the user to move from the nearest station to the parking location of vehicle 100 can be calculated by dividing a distance between the location of the nearest station and vehicle location Pv by an expected walking speed of the user, for example.

As described above, vehicle ECU 150 according to the present modification calculates user traveling speed Vu and user traveling route Ru using the history of user locations Pu. When it is determined that the user is traveling using public transportation based on user traveling speed Vu and user traveling route Ru, traveling time Tu is calculated using timetable information Ts of the public transportation that is being used by the user. Hence, traveling time Tu can be estimated more precisely. Accordingly, the time of completing the charging of power storage device 110 can be more precisely close to the time of arrival of the user to vehicle 100.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power control device for a vehicle, the vehicle including a power storage device configured to be charged with power supplied from a power supply facility external to the vehicle, the power control device comprising:
   a communication device configured to obtain user location information indicating a present location of a user of the vehicle; and
   a controller configured to control charging of the power storage device using the power supply facility,
   in a standby state for the charging of the power storage device using the power supply facility, the controller being configured to
      calculate a traveling route of the user using the history of the user location information obtained by the communication device,
      calculate a traveling speed of the user using a history of the user location information obtained by the communication device,
      determine if the user is traveling using public transportation based on the traveling route of the user and the traveling speed of the user,
      when it is determined that the user is using public transportation, calculate a traveling time required for the user to arrive at the vehicle using timetable information of the public transportation that is being used by the user,
      when it is determined that the user is not using public transportation, calculate a traveling time required for the user to arrive at the vehicle using the traveling speed,
      calculate a charging time required to complete the charging of the power storage device, using an amount of power stored in the power storage device, and
      start the charging of the power storage device using the power supply facility when a difference between the traveling time and the charging time becomes less than a predetermined value.

2. The power control device according to claim 1, wherein the controller is configured to further calculate a distance to the user using the user location information, and calculate the traveling time using the traveling speed of the user and the distance to the user.

* * * * *